July 29, 1969   J. T. THORP, JR   3,458,620
COMPRESSING MACHINE FOR SEALING STRIP
Filed Dec. 5, 1966   2 Sheets-Sheet 1

INVENTOR
JAMES T. THORP JR.
BY *Cohn and Powell*
ATTORNEYS

July 29, 1969  J. T. THORP, JR  3,458,620
COMPRESSING MACHINE FOR SEALING STRIP
Filed Dec. 5, 1966  2 Sheets-Sheet 2
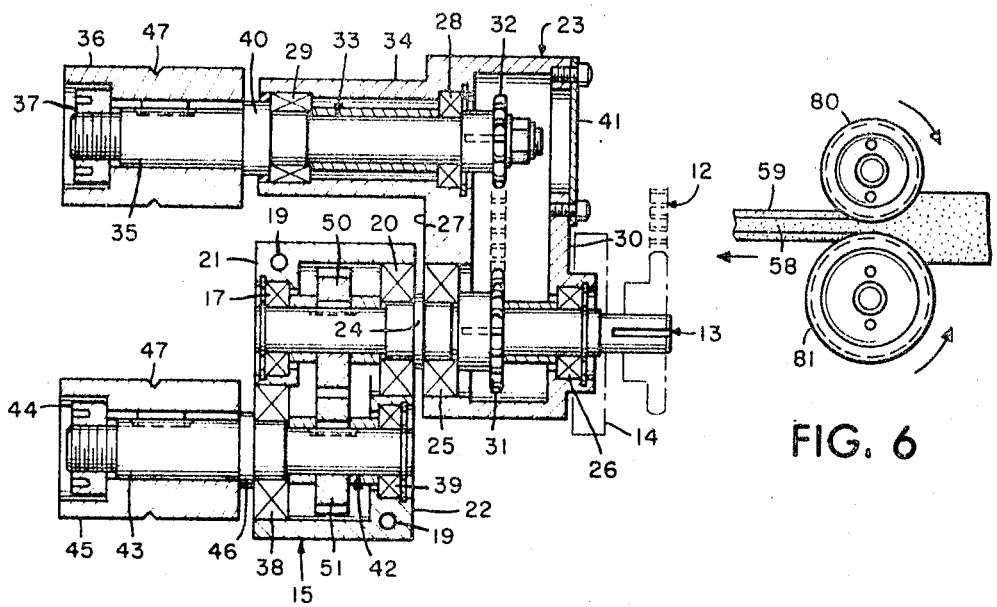
FIG. 5
FIG. 6
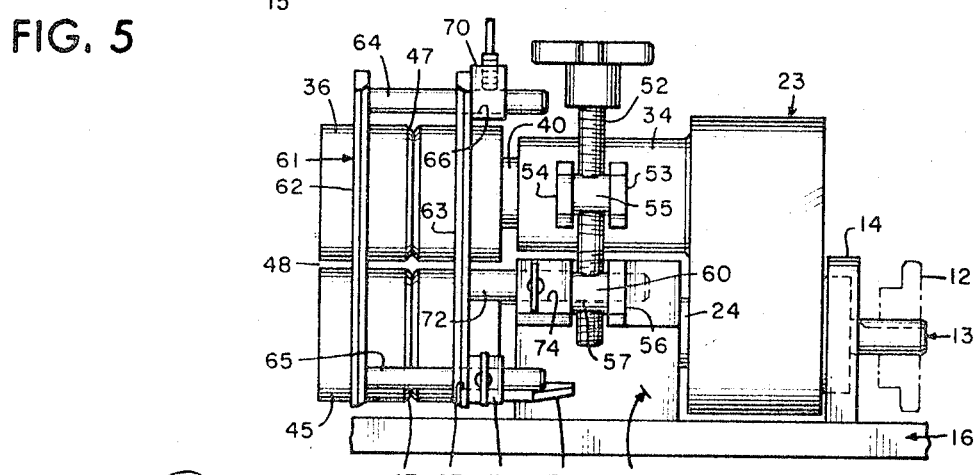
FIG. 4
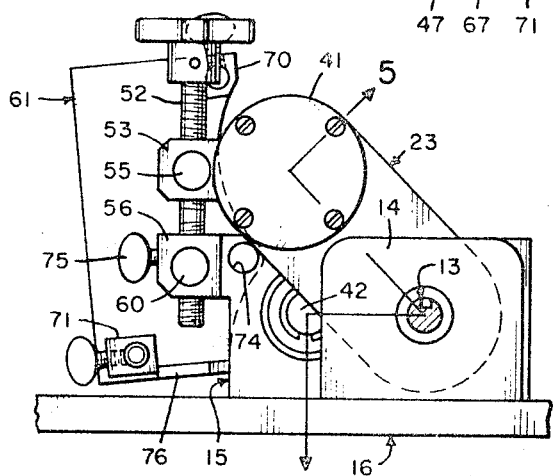
FIG. 3
INVENTOR
JAMES T. THORP JR.
BY *Cohn and Powell*
ATTORNEYS United States Patent Office 3,458,620
Patented July 29, 1969

3,458,620
COMPRESSING MACHINE FOR SEALING STRIP
James T. Thorp, Jr., St. Louis, Mo., assignor to Lambert Products, Inc., St. Louis, Mo., a corporation of Missouri
Filed Dec. 5, 1966, Ser. No. 599,022
Int. Cl. B29c *15/00*
U.S. Cl. 264—320                                       7 Claims

ABSTRACT OF THE DISCLOSURE

This machine induces lateral compression and also contraction, in a direction transverse to the lateral compression, into a sealing strip having delayed shape restoration characteristics after release of the compression forces. The machine includes a pair of spaced rolls providing a gap adapted to receive the strip and induce temporary compression therein. Drive means rotate the rolls at differential speeds whereby to provide drag on one side of the strip and thereby induce temporary shortening therein. The roll shafts are parallel to the driveshaft. One shaft rotates in fixed relation, and the other in swinging relation to the driveshaft whereby to facilitate adjustment of the gap. The method of producing a compressed, preshorted sealing strip is also disclosed.

---

This invention relates generally to improvements in a machine for inducing temporary volumetric change in a bitumen impregnated polyurethane foam sealing strip, and more particularly to a machine which induces a temporary shortening in the length of such a sealing strip. The invention relates also to a method of inducing temporary shortening into such a sealing strip and to the product thereby produced.

Bitumen impregnated polyurethane foam has properties which make it admirably suited for use as a joint sealer, and as a thermal and acoustic insulator. One such property is its ability to achieve delayed, gradual restoration of its original shape after release of an imposed compressive force. This property is especially valuable when the material is used as a roadway joint filler since a preformed, impregnated foam strip, thicker than the premolded joint into which it is placed, may be compressed and placed within the joint with ease. Because of the ability of the sealing strip to tend to reurn to its original shape, when unrestrained, it will completely fill the joint. Moreover, when the joint opens up because of contraction of the roadway slab, the sealer will follow such movement and expand to fill the now enlarged joint up to the limit of its original shape.

Unfortunately, with conventional methods, when the thickness of the strip is initially reduced by compression preparatory to installation, the strip increases in length. This is probably due to an effect similar in character to that which results in Poison's ratio for solid materials. The magnitude of this extension in length is about 5% of the original length for a typical roadway slab joint.

In the situation frequently encountered, where it is necessary to fill a joint having closed ends, this phenomenon presents a problem. For instance, if the seal is cut to an exact length initially, the extension will make it difficult, if not impossible, to install the seal. On the other hand, if the seal is cut short initially so that the joint will be filled when the extension occurs, subsequent shortening, after installation, will leave a gap in the joint which clearly is not conducive to water tightness. This is particularly apparent, when, as is customary, several lengths of sealing strip are placed end to end in order to seal one roadway joint.

Ideally, the installed length of the sealing strip should be slightly shorter than the length of the joint to allow for convenient installation, and the seal should have a build-in contraction which would allow it to expand to a perfect fit in its operating condition. It is the principal object of the present invention to provide a machine which will produce a bitumen impregnated polyurethane foam sealing strip having a built-in length contraction. It is a further object to disclose the method whereby this may be achieved.

Another important object is realized by providing a pair of rolls having curved contact surfaces for progressively inducing lateral compression and causing contraction in a direction transverse to the lateral compression into a bitumen impregnated polyurethane foam sealing strip as the strip is fed between the rolls.

An important object is the provision of means imparting a different linear speed to each roll and thereby to the upper and lower sealing strip sides in contact with the rolls. In this way a drag is induced into the sealing strip as the strip is progressively compressed, the drag effectively producing a built-in contraction along the length of the strip. The different linear speeds may be produced by several means as, for example, in one present embodiment by providing rolls of the same diameter, but having different angular speeds. Alternatively different linear speeds may be achieved by providing rolls having different diameters but the same angular speed.

A further important object is achieved by providing rolls having oppositely facing annular grooves producing a sealing strip having oppositely facing protuberances continuous along the length of the strip. The distance across the protuberances is substantially that of the thickness of the premolded slot into which the seal is to be inserted, and the existence of the protuberances facilitates installation of the seal.

It is an important object to provide pivotal means perpendicular to the axis of one roll whereby that roll may be raised or lowered relatively to the other roll to enable the gap between the rolls to be adjusted, thereby predetermining the initial compression induced in the sealing strip.

Yet another important object is the provision of screw jack means, including rotatable nuts, for fine adjustment of the gap between the rolls while the machine is in operation.

Still another important object is realized by providing guide plates perpendicular to the axis of rotation of the rolls to facilitate the feeding of the sealing strip through the rolls.

Important objects are to provide motor means driving the rolls, and to provide means making the machine mobile.

It is an important object to disclose a method whereby a temporary contraction may be induced into a bitumen impregnated polyurethane sealing strip.

An important object is to provide a machine that is simple and durable in construction, economical to manufacture, and efficient in operation.

The foregoing and numerous other objects and advantages of the invention will more clearly appear from the following detailed description of preferred embodiments, particularly when considered in connection with the accompanying drawings, in which:

FIG. 3 is an enlarged fragmentary rear elevational view on line 3—3 of FIG. 1;

FIG. 4 is an enlarged end elevational view on line 4—4 of FIG. 1 illustrating the sealing strip guide plates;

FIG. 5 is a sectional elevation on line 5—5 of FIG. 3;

FIG. 6 is a fragmentary illustration of an alternate roll design showing rolls of different diameters;

Figure 1:
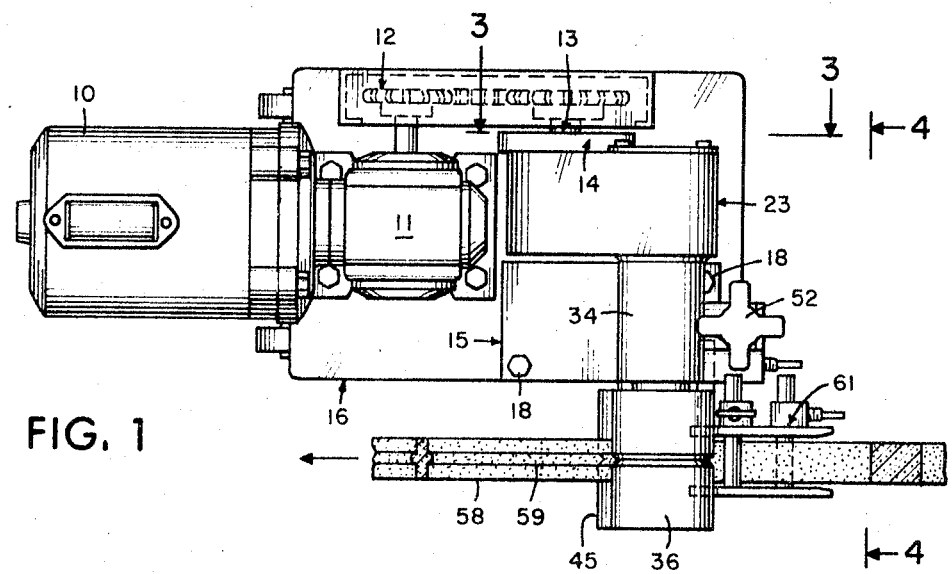
FIG. 1 is a plan view of a machine having motor driven rolls.

Referring now by characters of reference to the drawings, and first to FIG. 1, it will be understood that the machine includes a drive unit comprising essentially an electric motor 10 coupled to a speed reducer 11. The reducer 11 is operatively coupled to a chain and sprocket system 12 which drives the principal shaft 13. As shown by FIG. 5, the principal shaft 13 is supported at one end by a bearing block 14, and is supported at the other end by the gear housing 15 which is rigidly attached to the base 16 (FIG. 1). Ball bearings 17 and 20, shown in FIG. 5, set into sides 21 and 22 respectively of the gear housing 15, provide mounting means for the principal shaft 13. Pivotally mounted on the principal shaft 13 between the bearing block 14 and the gear housing 15 is a sprocket housing 23. A flanged portion 24 of the principal shaft 13 acts as a spacer between the gear housing 15 and the sprocket housing 23. Ball bearings 25 and 26 set into sides 27 and 30 respectively of the sprocket housing 23 serve as a mounting means for the sprocket housing 23.

Sprocket 31, keyed to the principal shaft 13, drives a smaller diameter sprocket 32 keyed to one end of an upper roll shaft 33. The upper roll shaft 33 is mounted within a cylindrical arm 34 projecting at right angles from and integrated with the sprocket housing 23 so that the upper roll shaft 33 is parallel to the principal shaft 13. At opposite ends of the cylindrical arm 34, ball bearings 28 and 29 provide mountings for the upper roll shaft 33. The upper roll shaft 33 extends beyond the cylindrical arm 34 to provide a stub axle 35. Keyed to this stub axle 35 is an upper roll 36 that is retained by a retaining nut 37. The roll 36 has a curved contact surface. A flanged portion 40 of the upper roll shaft 33 acts as a spacer between the cylindrical arm 34 of the sprocket housing 23 and the upper roll 36. A removable cover plate 41 provides access into the sprocket housing 23.

The gear housing 15 is securely bolted to the base 16 by two bolts 18 passing through vertical holes 19 located at diametrically opposite corners of the gear housing 15.

A lower roll shaft 42 is mounted within the gear housing 15 having its axis of rotation parallel to the axis of rotation of the principal shaft 13. Ball bearings 38 and 39 set into sides 21 and 22 respectively of gear housing 15, serve as mounting means for the lower roll shaft 42. The lower roll shaft 42 extends beyond the gear housing 15 to provide a stub axle 43. Keyed to this stub axle 43, and retained on it by means of retaining nut 44, is a lower roll 45 having a curved contact surface. A flanged portion 46 of the lower roll shaft 42 acts as a spacer between the gear housing 15 and the lower roll 45.

Both the upper roll 36 and the lower roll 45 are provided with centrally located annular V-grooves 47 constituting peripheral recesses on their external curved surface. The upper and lower rolls 36 and 45 are axially located on their respective stub axles 35 and 43 so that the annular V-grooves 47 are in alignment with each other perpendicularly to the axis of rotation of the parallel rolls 36 and 45.

Within the gear housing 15, mounted on and keyed to the principal shaft 13, is a spur gear 50. Oppositely placed within the gear housing 15, mounted on and keyed to the lower roll shaft 42 in driving contact with the spur gear 50, is a substantially similar driven spur gear 51. Rotation of the principal shaft 13, because of the drive between sprockets 31 and 32, induces rotation in the same direction to the upper roll shaft 33. On the other hand, because of the drive between spur gears 50 and 51, rotation in an opposite direction to that of the principal shaft 13 is induced in the lower roll shaft 42. Consequently, the upper and lower rolls 36 and 45 rotate oppositely.

The spur gears 50 and 51 have a dual function. In addition to reversing the direction of the lower roll shaft, the spur gears 50 and 51 provide a means of displacing the axis of the lower roll shaft 42 in parallel spaced relation to the axis of the principal shaft 13. Thus, the upper roll shaft 33, because of the pivoting capability of the sprocket housing 23 about the principal shaft 13, may be swung toward or away from the lower roll shaft 42 as desired. In this way the gap 48 between the rolls 36 and 45 may be adjusted to suit various thicknesses of the sealing strip 58 and/or to induce varying degrees of compression. The screw jack 52 provides a convenient means of accomplishing this adjustment mechanically as indicated in FIGS. 3 and 4. Lugs 53 and 54, welded to the pivoted sprocket housing 23, are bored laterally to provide a mounting for a barrel nut 55 to which the upper portion of the screw jack 52 is threadedly connected. Lugs 56 and 57, welded to the end of the fixed, gear housing 15, are likewise bored laterally to provide a mounting for a barrel nut 60 through which the lower portion of the screw jack 52 is also threadedly connected.

The screw jack 52 has its upper portion provided with left hand thread and its lower portion provided with right hand thread. Consequently, rotation of the screw jack in one direction will bring the upper and lower rolls 36 and 45 together while rotation in the counter direction takes them apart. Thus, the gap 48 between the rolls 36 and 45 may be increased or decreased as desired.

An adjustable guide system 61 is provided to facilitate the feeding of the sealing strip 58 between the rolls 36 and 45. The guide system 61, as clearly shown in FIG. 4, includes vertical matching guide plates 62 and 63, each having one edge profiled to conform substantially to the curved contact surfaces of the rolls 36 and 45 in the compression zone. Guide plate 62 has perpendicular support rods 64 and 65 welded to the upper and lower portions of its inside face. Guide plate 63 is provided with corresponding bored holes 66 and 67 respectively into which the support rods are slidably received as shown in FIG. 4. Thumb screw blocks 70 and 71 are welded on the outer face of guide plate 63 and are aligned with the bored holes 66 and 67 respectively to allow the support rods 64 and 65 to be slidably received therethrough. Hence by tightening the thumb screw blocks 70 and 71, the spaced relation of guide plate 62 to guide plate 63, may be fixed. The guide system 61 is thus able to accommodate a given width of the sealing strip 58.

A single support rod 72, projecting perpendicularly from the outer face of guide plate 63, and welded to that guide plate 63, is slidably received in a hole 74 (FIG. 3) bored laterally through the upper left corner of the gear housing 15 as may be seen in FIG. 3. Support rod 72, slidably received in hole 74 forms a pivot about which the guide system 61 may be rotated to adjust its proximity to the roll gap 48. In addition, the guide system 61 may be located as desired laterally with respect to the annular V-grooves 47 by means of a thumb screw 75 which can be tightened against the pivoted support rod 72 after the adjustment is made. A toe stop 76 is provided on the bottom portion of the outer face of guide plate 63 to cooperate with the gear housing 15 and limit the pivoting movement of the guide system 61. This prevents inadvertent contact between the guide system 61 and the lower roll 45.

Four casters 77, fixed to the under side of the base 16, provide the machine with mobility.

It is felt that the functional advantages of the machine have become fully apparent from the foregoing description of parts but for completeness of disclosure, the operation and usage will be briefly described.

The principal shaft 13 is fixed in location and is driven by the chain and sprocket system 12 from the drive unit comprising the electric motor 10 and the reducer 11. The upper and lower roll shafts 33 and 42 are both driven by the principal shaft 13 as is clearly illustrated in FIG. 5. A chain and sprocket system drives the upper roll shaft 33, and since the upper roll shaft sprocket 32 is smaller than the principal shaft sprocket 31, the angular speed of the upper roll 36 is greater than that of the principal shaft 13. Cooperating spur gears 50 and 51 of equal diameter, on both the principal shaft 13 and the lower roll shaft 42 on the other hand insure that the angular speed of shafts 13 and 42 is the same. The upper roll 36 and the lower roll 45 are thus rotated at different angular speeds and in counter rotation. Since the rolls 36 and 45 in the embodiment of FIGS. 1 through 5 are the same diameter, the tangential contact speeds between the upper and lower sides of the sealing strip 58 and their respective rolls 36 and 45 are different. This speed difference, in combination with the compression force exerted on the sealing strip 58 as it passes between the relatively narrow gap 48 separating the rolls 36 and 45, has the effect of shortening the sealing strip 58 rather than lengthening it which is the observed effect when the tangential contact speeds of the rolls 36 and 45 are equal.

FIG. 6 illustrates an alternative method of achieving different tangential speeds by having an upper roll 80 and a lower roll 81 of different diameters but rotating at the same angular velocity.

Figure 2:
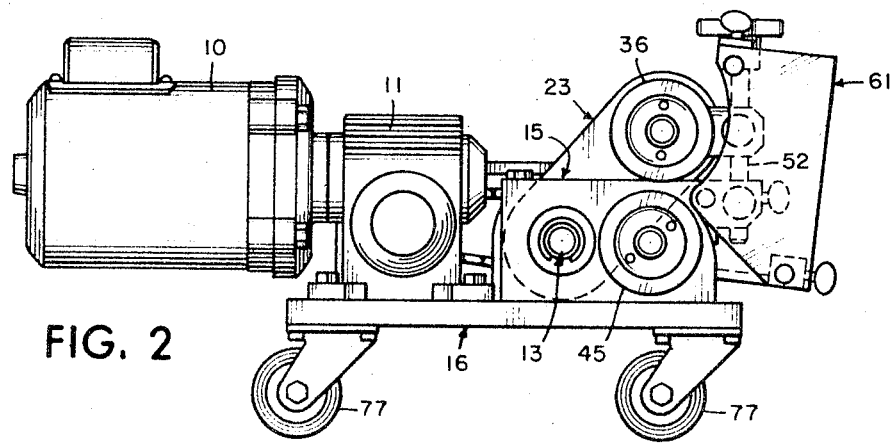
FIG. 2 is a front elevational view showing the machine mounted on casters.

The lower roll 45 is fixed in location and disposed in parallel relation to the principal shaft 13 as shown in FIG. 2. The upper roll 36 on the other hand, because the sprocket housing 23 is pivotally mounted on the principal shaft 13, may be swung about the principal shaft 13 and thereby brought selectively into closer or farther proximity to the lower roll 45 as desired. Screw jack 52, threadedly connected to the sprocket housing 23 and also threadedly connected to the fixed gear housing 15, provides a means of adjusting the spaced relationship between the rolls 36 and 45. In this way, the compressive force exerted on the sealing strip 58 as it is fed progressively through the rolls 36 and 45, may be regulated.

The guide system 61 provides a means of setting the machine to accept a particular width of sealing strip 58 and insures that the strip 58 is correctly aligned as it is fed between the rolls 36 and 45. By virtue of the pivoted support rod 72, the guide system 61 may be adjusted laterally to regulate the location, on the compressed sealing strip 58, of the continuous protuberances 59 which are formed on the strip 58 by the action of the annular V-grooves 47 centrally placed on the curved surface of each roll 36 and 45.

It has been discovered that coating the contact surface of the rolls 36 and 45, such as with silicone, facilitates the operation by preventing undue adhesion between the rolls 36 and 45 and the bitumen impregnated sealing strip 58.

Figure 7:
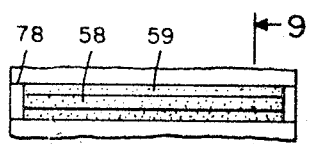
FIG. 7 is a plan view of a roadway joint filled with a newly compressed sealing strip.
Figure 9:
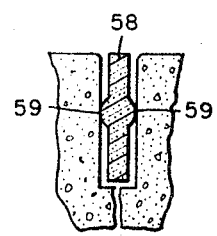
FIG. 9 is an enlarged sectional view on line 9—9 of FIG. 7.

FIGS. 7 and 9 illustrate, by way of example, the initial disposition of a sealing strip 58 inserted in place in a sawed roadway joint 78.

Figure 10:
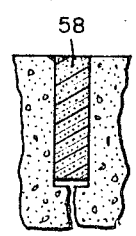
FIG. 10 is an enlarged sectional view on line 10—10 of FIG. 8.
Figure 8:
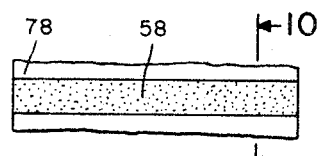
FIG. 8 is a plan view of the roadway joint of FIG. 7 after expansion of the sealing strip.

FIGS. 8 and 10 illustrate the disposition of the same strip 58 after expansion has taken place and the roadway joint 78 is completely filled. It will be noticed that the continuous protuberances 59 serve to support the compressed sealing strip 58 after initial insertion into the joint 78.

Although the invention has been described by making detailed reference to preferred embodiments, such detail is to be understood in an instructive rather than in a restrictive sense, many variations being possible within the scope of the claims hereunto appended.

I claim as my invention:

1. A machine for inducing lateral compression and contraction in a direction transverse to the lateral compression into a preshaped article composed of an elastic material having delayed shape restoration characteristics after release of the compressive forces, comprising:
   (a) a roll including a first contact surface,
   (b) a roll including a second contact surface disposed in spaced relation from the first contact surface to provide a gap between the rolls,
   (c) means providing a gap of a smaller width than the restored shape of the preshaped article, to induce primary compression into the preshaped article, composed of an elastic material having delayed shape restoration characteristics after release of the compressive forces, which is placed between said rolls, and
   (d) drive means rotating at least one of the rolls to induce differential linear speeds to the first and second contact surfaces and moving one side of the article engaged by the first contact surface relative to the opposite side of the article engaged by the second contact surface in a direction transverse to the direction of primary compression during the primary compressing process resulting in the contraction of the compressed article in said transverse direction.

2. A machine as defined in claim 1 in which:
   (e) the drive means includes:
      (1) a principal driveshaft,
      (2) a rotatable shaft parallel to the principal driveshaft and fixedly mounting the first roll,
      (3) a rotatable shaft parallel to the principal driveshaft and fixedly mounting the second roll,
      (4) coupling means connecting the principal driveshaft to the shaft mounting the first roll to rotate the roll surface at one linear speed,
      (5) coupling means connecting the principal driveshaft to the shaft mounting the second roll to rotate the roll surface at another linear speed,
      (6) mounting means mounting one of the roll shafts in radially eccentric relation to the principal driveshaft for oscillation about the driveshaft and in adjacent variable spaced relation to the other roll shaft.

3. A machine for inducing lateral compression and contraction in a direction transverse to the lateral compression into a preshaped article having delayed shaped restoration characteristics after release of the compression forces, comprising:
   (a) a base,
   (b) a principal driveshaft mounted on the base,
   (c) a pair of rotatable roll shafts mounted in adjustable parallel relation,
   (d) a pair of rolls, each roll including a curved contact surface, each roll fixedly mounted on one of the rotatable roll shafts in spaced relation to the other roll providing a gap between the curved contact surfaces,
   (e) an elongate arm pivotally mounted on the driveshaft including means at the free end of the arm mounting one of the roll shafts in cantilever relation to said arm and in parallel relation to the principal driveshaft,
   (f) means mounting the other roll shaft on the base,
   (g) means coupling the roll shafts to the principal driveshaft for rotating the rolls, the contact surfaces of the rolls being rotated at different linear speeds, and
   (h) adjustable means holding the roll shafts apart and selectively adjusting the gap between the rolls.

4. A machine as defined in claim 3 in which:
   (i) the means coupling the principal driveshaft to the roll shaft mounted in cantilever relation on the elongate pivot arm, includes chain and sprocket connection between the last said two shafts,
   (j) a housing for the chain and sprocket connection provides the pivotally mounted arm, (k) the drive means coupling the principal driveshaft to the base-mounted roll shaft includes matching and cooperating gears attached to each of the last said two shafts, (l) a gear housing attached to the base provides means mounting one end of the principal driveshaft and means mounting the base-mounted roll shaft, and (m) a screw jack threadedly connected between the pivotally mounted arm and the base provides the adjustable means holding the roll shafts apart.

5. A machine as defined in claim 4, in which:

(n) guide means progressively guide the article through the rolls, the guide means including:
 (1) a pair of spaced plates, each plate having a profile substantially conforming to the curved contact surfaces of the rolls in the compression zone,
 (2) one of the plates having a rod rigidly attached to and projecting outwardly from the plate, the other of the plates having a corresponding hole slidably receiving the rod whereby the guide plates are adjustable relative to each other,
 (3) means fixing the slidable rod in position in the hole, and
 (4) pivot means including a pivot shaft substantially parallel to the roll shafts attaching one plate to the base to pivotally adjust both plates together relatively to the rolls.

6. A method of inducing temporary compression and contraction into an oppositely faced preshaped article of elastic material, the material having delayed shape restoration characteristics after releasing of compressing, method comprising the steps of:

(a) passing the preshaped article of elastic material, the material having delayed shape restoration characteristics after release of compression, through a pair of spaced rolls to apply pressure to opposed sides of the article to draw the sides together, thereby inducing primary lateral compression into the article, and (b) rotating the contact surfaces of the spaced rolls at a different linear speed to apply a drag to one of the sides during the primary compressing step in a direction transverse to the direction of primary compression, thereby contracting the article in the transverse direction.

7. A method as defined in claim 6, including the step of:

(c) applying relatively less pressure to a portion of at least one side of the article to provide the article with a temporary protuberance on that side.

References Cited

UNITED STATES PATENTS

| | | | |
|---|---|---|---|
| Re. 11,890 | 4/1902 | Adams | 18—11 |
| 591,520 | 10/1897 | Zoeller | 18—11 |
| 727,229 | 5/1903 | Turner | 18—11 XR |
| 827,936 | 8/1906 | Obermaier. | |
| 1,342,114 | 1/1920 | Iddon. | |
| 1,606,271 | 11/1926 | Stratford | 18—11 XR |
| 1,615,475 | 1/1927 | Midgley | 18—11 XR |
| 1,837,763 | 6/1958 | Whittum. | |
| 2,852,806 | 9/1958 | Erdelyi | 18—11 XR |
| 3,060,503 | 10/1962 | Eckert | 18—11 XR |
| 3,370,345 | 2/1968 | Mattis | 18—11 |
| 3,376,601 | 4/1968 | Seanor et al. | |

WILLIAM J. STEPHENSON, Primary Examiner

U.S. Cl. X.R.

18—11; 264—342